(12) United States Patent
Shaw

(10) Patent No.: US 6,405,838 B1
(45) Date of Patent: Jun. 18, 2002

(54) ELECTRIC PARKING BRAKE FOR DRUM BRAKES

(75) Inventor: Schuyler Scott Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/634,673

(22) Filed: Aug. 8, 2000

(51) Int. Cl.[7] ............................................. F16D 65/14
(52) U.S. Cl. ................................................. 188/106 P
(58) Field of Search ........................... 188/106 P, 156, 188/326, 363; 303/3, 15, 20

(56) References Cited

U.S. PATENT DOCUMENTS

| | | | | |
|---|---|---|---|---|
| 5,024,299 A | * | 6/1991 | Shaw .......................... | 188/156 |
| 5,148,894 A | | 9/1992 | Eddy, Jr. .................... | 188/72.6 |
| 5,150,773 A | | 9/1992 | Hickey et al. | |
| 5,769,189 A | | 6/1998 | Heibel et al. | |
| 5,823,636 A | * | 10/1998 | Parker ........................... | 303/3 |
| 5,855,255 A | * | 1/1999 | Bock ............................ | 188/162 |

* cited by examiner

Primary Examiner—Christopher P. Schwartz
Assistant Examiner—C. T. Bartz
(74) Attorney, Agent, or Firm—Robert M. Sigler

(57) ABSTRACT

A drum brake assembly for a vehicle is provided. A backing plate supports opposing brake shoes with a drum disposed there about. Each of the brake shoes has a portion in spaced relation from one another. A wheel cylinder is supported by the backing plate and is arranged between the portions of the brake shoes for forcing the portions away from one another to engage the brake shoes with the drum in a brake position. A strut interconnects the brake shoes proximate to the portions. A lever has a first end, which extends to a second end, supported from one of the portions by a pivotal connection. The lever is rotatable about the pivotal connection between a normal operating position in which the strut is spaced from the lever and a parking brake position in which the lever engages the strut to maintain the portions in the brake position. An electric parking brake actuator is supported by the backing plate and includes a linkage that coacts with the second end of the parking brake lever. The linkage is actuatable by the electric parking brake actuator for moving the lever between the normal operating and the park brake positions. The electric parking brake actuator moves the lever to the parking brake position in response to a parking brake signal with the brake shoes in the brake position.

3 Claims, 2 Drawing Sheets

ELECTRIC PARKING BRAKE FOR DRUM BRAKES

TECHNICAL FIELD

This invention relates to a drum brake assembly, and more specifically, the invention relates to a drum brake assembly incorporating an electric parking brake actuator.

BACKGROUND OF THE INVENTION

Vehicle brakes are used to slow the vehicle and also to maintain the vehicle in a parked position. Drum brakes are one common type of vehicle brake. Drum brake assemblies utilize opposing arcuate brake shoes that are movable away from one another into engagement with an inner surface of a drum to slow the vehicle. Typically, a hydraulic wheel cylinder forces the brake shoes into engagement with the drum. The same brake shoes may also be used to maintain the vehicle in the parked position. For example, drum brake assemblies have employed a separate mechanical linkage, or parking brake lever, that is actuatable by a cable to maintain the brake shoes in engagement with the drum. Such mechanical parking brakes have presented various problems that have been partially addressed by the use of electric parking brake mechanisms.

Some electric parking brake mechanisms have eliminated the parking brake lever and completely redesigned the drum brake assembly to incorporate the electric parking brake mechanism. These mechanisms have required high torque motors and a gearbox to generate sufficient force to apply the brakes, which adds significant cost to the drum brake assembly. Furthermore, high torque motors utilize a significant amount of power, which is undesirable in modern vehicles. Therefore, what is needed is an electric parking brake mechanism that requires relatively little power and that may be easily incorporated into a conventional drum brake assembly.

SUMMARY OF THE INVENTION

The present invention provides a drum brake assembly for a vehicle. The assembly includes a backing plate having primary and secondary support pins with primary and secondary brake shoes supported respectively thereon. Each of the brake shoes has a portion in spaced relation from one another. A drum is disposed about the brake shoes. A wheel cylinder is supported by the backing plate and is arranged between the portions of the brake shoes for forcing the portions away from one another to engage the brake shoes with the drum in a brake position. A strut interconnects the brake shoes proximate to the portions. A lever has a first end, which extends to a second end, supported from one of the portions by a pivotal connection. The lever is rotatable about the pivotal connection between a normal operating position in which the strut is spaced from the lever and a parking brake position in which the lever engages the strut to maintain the portions in the brake position. An electric parking brake actuator is supported by the backing plate and includes a linkage that coacts with the second end of the parking brake lever. The linkage is actuatable by the electric parking brake actuator for moving the lever between the normal operating and the park brake positions. The electric parking brake actuator moves the lever to the parking brake position in response to a parking brake signal with the brake shoes in the brake position.

Accordingly, the above invention provides an electric parking brake mechanism that requires relatively little power and that may be easily incorporated into a conventional drum brake assembly.

BRIEF DESCRIPTION OF THE DRAWINGS

Other advantages of the present invention can be understood by reference to the following detailed description when considered in connection with the accompanying drawings wherein.

DESCRIPTION OF THE PREFERRED EMBODIMENT

Figure 1:
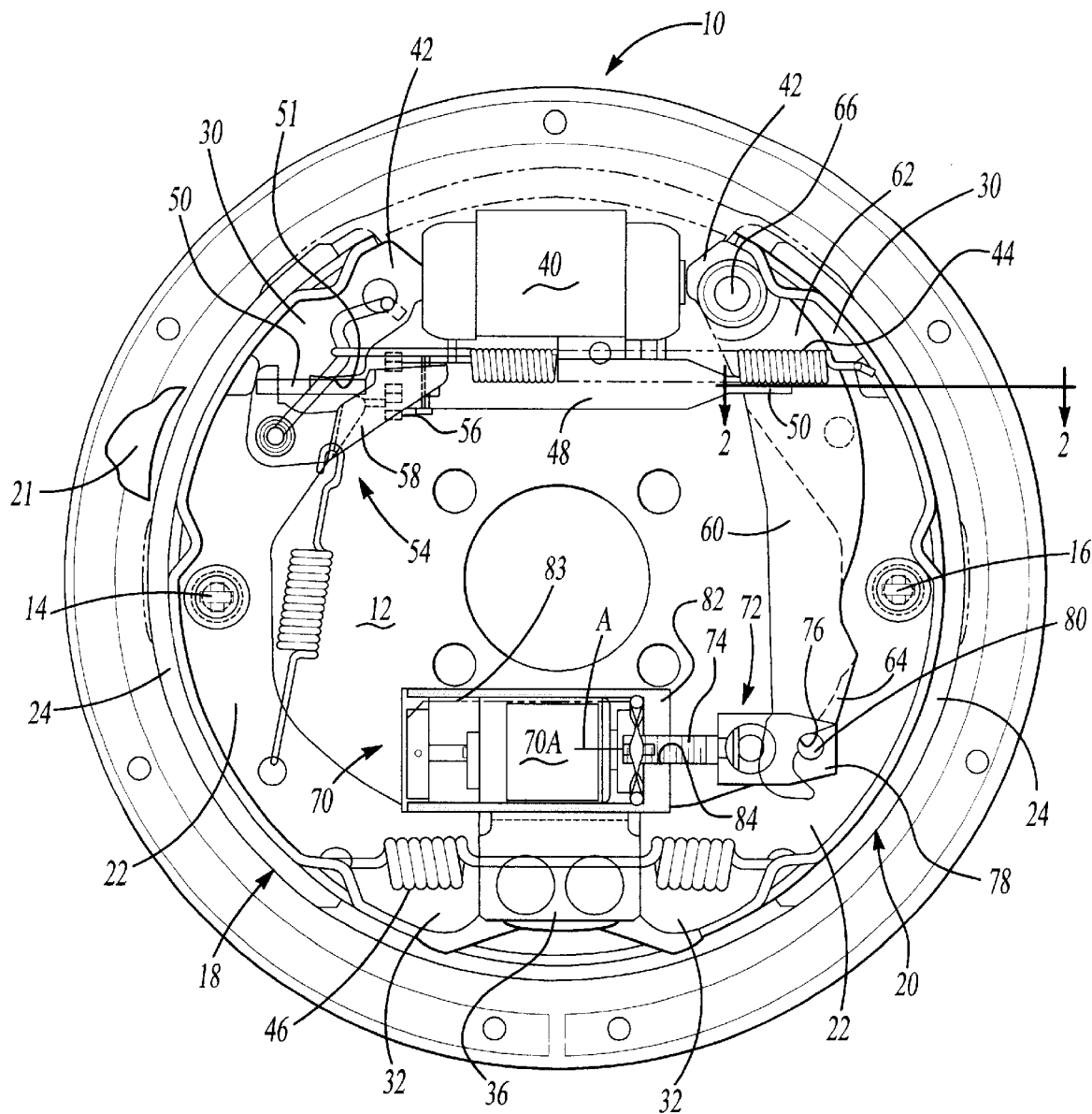
FIG. 1 is front elevational view of a drum brake assembly of the present invention.

A drum brake assembly 10 for a vehicle is shown in FIG. 1. The assembly 10 includes a backing plate 12 having primary 14 and secondary 16 support pins with primary 18 and secondary 20 brake shoes supported respectively thereon. A drum 21 is disposed about the brake shoes 18, 20. The brake shoes 18, 20 include a web 22 that supports a friction lining 24 adjacent to the drum 21. Each of the brake shoe webs 22 has a portion 30 in spaced relation from one another that extend to a second portion 32. Preferably, an anchor block 36 is arranged between the brake shoes 18, 20 to support the second portions 32 in spaced relationship from one another.

A wheel cylinder 40 is supported by the backing plate 12 and is arranged between the portions 30 of the brake shoes 18, 20. The wheel cylinder 40 includes pistons on either end, as is well known, that move in opposite directions to force the portions 30 away from one another to engage the brake shoes 18, 20 with the drum 21 when in a brake position. Hydraulic fluid is forced into a chamber between the pistons by a hydraulic brake actuator, such as a master cylinder. Portions 30 have ears 42 that are received in indentations in the pistons (not shown). As the portions 30 are forced away from one another, the brake shoes 18, 20 pivot outward about pins 14, 16.

A strut 48 interconnects the brake shoes 18, 20 below the wheel cylinder 40 and proximate to the portions 30. Opposing ends 50 of the strut 48 engage each of the webs 22 to hold the portions 30 in spaced relation. The ends 50 are received in slots 51 in the webs 22 (only one shown in FIG. 1). Upper 44 and lower 46 return springs interconnect the portions 30 and second portions 32 for retracting the brakes shoes 18, 20 from the drum 21 against the strut 48 and anchor block 36. In this manner, the anchor block 36 and strut 48 together determine the spacing of the brake shoes from the drum 21. As the linings 24 wear, the brake shoes 18, 20 must be moved closer to the drum 21 to maintain desirable brake application characteristics, such as consistent brake pedal travel and brake response time. To this end, the strut 48 includes a length that is mechanically adjusted by a wear adjustment mechanism 54 to accommodate wear in the brake shoes 18, 20. In the embodiment shown, a star wheel 56 is turned by arm 58 when the vehicle travels in reverse thereby lengthening the strut 48, as is well known.

Figure 2A:
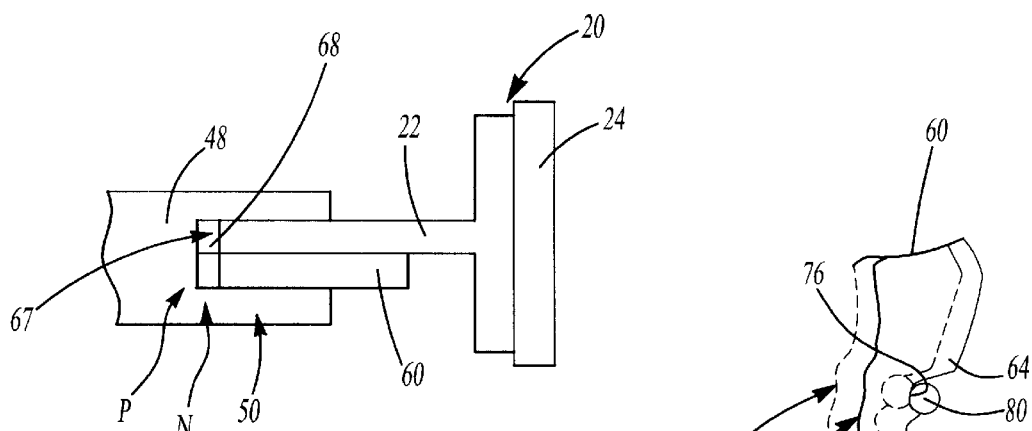
FIG. 2A is a cross-sectional view of a lever of the present invention taken along line 2—2 of FIG. 1 illustrating normal operating and park brake positions.

A parking brake lever 60 has a first end 62 extending to a second end 64. The lever 60 is supported from one of the portions 30 by a pivotal connection 66. Referring now to FIG. 2A, the strut 48 maintains the brake shoes 18, 20 in spaced relation. When the brakes are not applied, the webs 20 abut a recess 67 in the ends 50 of the strut 48. When the brakes are applied with the wheel cylinder 40 forcing the portions 30 away from one another, a gap 68 is created between the webs 20 and the strut 48, as shown in FIG. 2A. The lever 60 is rotatable about the pivotal connection 66 between a normal operating position, N, in which the strut 48 is spaced from the lever 60 when in the brake position and a parking brake position, P, in which the lever 60 engages the strut 48 and closes the gap 68 to maintain the portions 30 in the brake position.

Returning to FIG. 1, an electric parking brake actuator 70 is supported by the backing plate 12 and includes a linkage 72 that coacts with the second end 64 of the parking brake lever 60. The linkage 72 is actuatable by the electric parking brake actuator 70 for moving the lever 60 between the normal operating, N, and the park brake, P, positions. The electric parking brake actuator 70 moves the lever 60 to the parking brake position, P, in response to a parking brake signal with the brake shoes 18, 20 in the brake position. That is, when a parking brake signal is received and the brake shoes 18, 20 are in the brake position, the electric parking brake actuator 70 moves the lever 60 to close the gap 68 between the strut 48 and the lever 60 to hold the brake shoes 18, 20 against the drum 21.

Figure 2B:
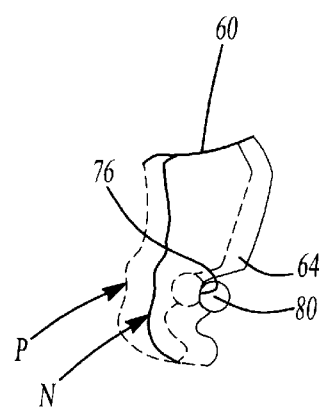
FIG. 2B is a partial view of the lever in the normal operating and park brake positions.

The linkage 72 includes a shaft 74 having an axis, A, with the shaft 74 movable along the axis, A, when the electric parking brake actuator 70 moves the lever 60. The second end 64 of the lever 60 includes a notch 76. The linkage 72 includes a clevis 78 supported rotatably supported on an end of the shaft 74 with a pin 80 that is engageable with the notch 76. The lever 60 is shown in the normal operating, N, and parking brake, P, positions in FIG. 2B. Preferably, the electric parking brake actuator 70 includes an electric motor 70a that is supported in a housing 82 mounted to the backing plate 12. Motor 70a need only generate enough force to move the weight of the lever 60 about pivot connection 66. The motor 70a is splined to the housing 82 by keyway 83 to prevent relative rotation between them, however, the motor 70a is free to slide within the housing 82 along the axis, A. The shaft 74 is threaded and received within a threaded hole 84 in the housing 82. As the shaft 74 is driven, the clevis 78 will advance or retract while the motor 70a slides within the housing 82.

Figure 3:
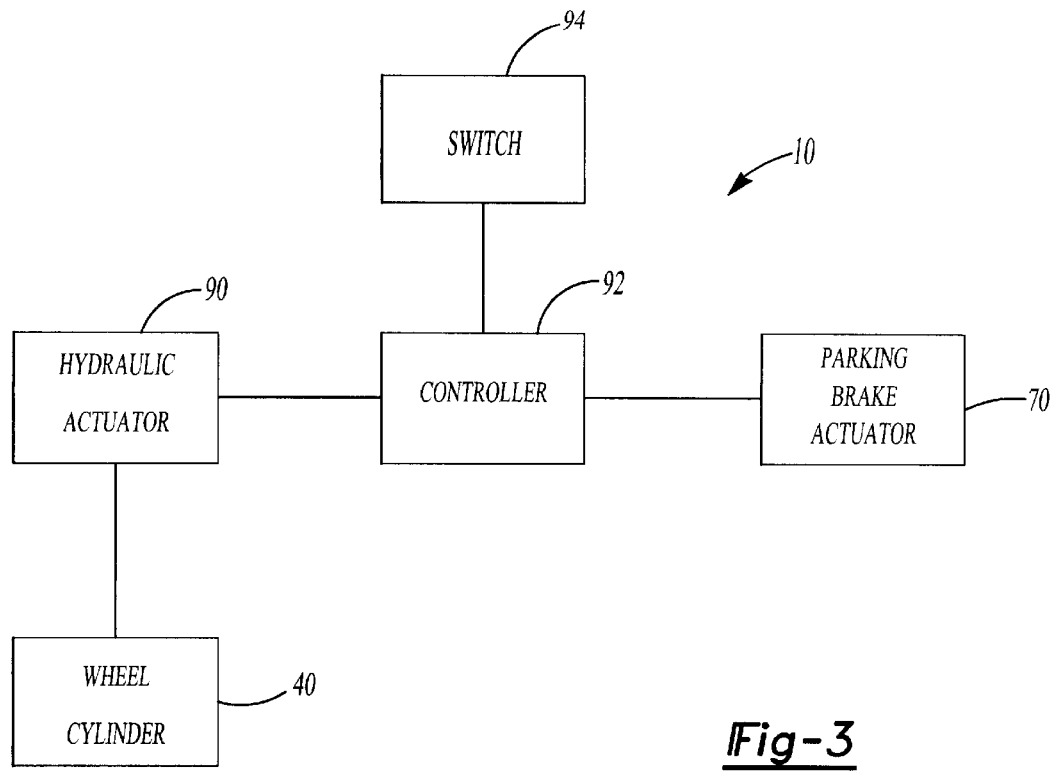
FIG. 3 is a schematic view of the control system of the present invention.

Referring to FIG. 3, the assembly 10 includes a hydraulic actuator 90 fluidly connected to the wheel cylinder 40. The hydraulic actuator 90 may include portions of the master cylinder or anti-lock braking system. A controller 92 is electrically connected to the hydraulic actuator 90 and the electric parking brake actuator 70 for controlling the actuators 70, 90 in response to the parking brake signal. A switch 94, which is preferably located in the cabin of the vehicle, is electrically connected to the controller 92 for producing the parking brake signal.

In operation, the vehicle operator actuates the switch 94 to employ the parking brake. The controller 92 then moves the brake shoes 18, 20 to the brake position by commanding the hydraulic actuator 90. The hydraulic actuator 90 fills the hydraulic chamber of the wheel cylinder 40 thereby forcing the portions 30 away from one another and creating gap 68 between strut 48 and lever 60. With the brake shoes 18, 20 held in the brake position by the hydraulic actuator 90, the controller commands the electric parking brake actuator 70 to retract the lever 60 to the parking brake position, P, to close the gap 68. The electric parking brake actuator 70 will reach a stall condition upon reaching the parking brake position, P, signaling the controller 92 that the parking brake has been applied. The linkage 72 mechanically retains the lever 60 in the parking brake position because the force of the lever 60 on the linkage 72 is unable to rotate the threaded shaft 74. As a result, power may be shut off to the motor 70a.

To release the parking brake, the operator must actuate the switch 94. The hydraulic actuator 90 must apply a brake force slightly greater than before so that the lever 60 may be advanced by the motor 70a. Otherwise, the stress in the brake assembly 10 would prevent the low torque motor 70a from moving the lever 60. With the brake force applied, the electric parking brake actuator 70 may advance the lever 60 to the normal operating position, N, thereby creating gap 68 and permitting the brake shoes 18, 20 to return to the retracted position.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A drum brake assembly for a vehicle, said assembly comprising:

a backing plate having primary and secondary support pins;

primary and secondary brake shoes supported by said primary and secondary support pins respectively, each of said brake shoes having a portion in spaced relation from one another;

a drum disposed about said brake shoes;

a wheel cylinder supported by said backing plate and interposed between said portions of said brake shoes for forcing said portions away from one another to engage said brake shoes with said drum in a brake position;

a strut interconnecting said brake shoes proximate to said portions;

a lever having a first end supported from one of said portions by a pivotal connection, said lever extending from said first end to a second end, and said lever rotatable about said pivotal connection between a normal operating position having said strut spaced from said lever and a parking brake position having said lever engage said strut to maintain said portions in said brake position;

an electric parking brake actuator supported by said backing plate and having a linkage coacting with said second end of said lever actuatable by said electric parking brake actuator for moving said lever between said normal operating and said park brake positions, said electric parking brake actuator moving said lever to said parking brake position in response to a parking brake signal with said brake shoes in said brake position;

wherein said linkage includes a shaft having an axis with said shaft movable along said axis when said electric parking brake actuator moves said lever between said normal operating and said parking brake positions; and wherein said second end includes a notch and said linkage includes a clevis supported on an end of said shaft with a pin engageable with said notch.

2. A drum brake assembly for a vehicle, said assembly comprising:
- a backing plate having primary and secondary support pins;
- primary and secondary brake shoes supported by said primary and secondary support pins respectively, each of said brake shoes having a portion in spaced relation from one another;
- a drum disposed about said brake shoes;
- a wheel cylinder supported by said backing plate and interposed between said portions of said brake shoes for forcing said portions away from one another to engage said brake shoes with said drum in a brake position;
- a strut interconnecting said brake shoes proximate to said portions;
- a lever having a first end supported from one of said portions by a pivotal connection, said lever extending from said first end to a second end, and said lever rotatable about said pivotal connection between a normal operating position having said strut spaced from said lever and a parking brake position having said lever engage said strut to maintain said portions in said brake position;
- an electric parking brake actuator supported by said backing plate and having a linkage coacting with said second end of said lever actuatable by said electric parking brake actuator for moving said lever between said normal operating and said park brake positions, said electric parking brake actuator moving said lever to said parking brake position in response to a parking brake signal with said brake shoes in said brake position;
- a hydraulic actuator fluidly connected to said wheel cylinder;
- a controller electrically connected to said hydraulic actuator and said electric parking brake actuator for controlling said actuators in response to said parking brake signal; and
- a switch electrically connected to said controller for producing said parking brake signal,
  - wherein said controller moves said brake shoes to said brake position with said hydraulic actuator and moves said lever to said parking brake position with said electric parking brake actuator in response to said parking brake signal.

3. A drum brake assembly for a vehicle, said assembly comprising:
- a backing plate having primary and secondary support pins;
- primary and secondary brake shoes supported by said primary and secondary support pins respectively, each of said brake shoes having a portion in spaced relation from one another;
- a drum disposed about said brake shoes;
- a wheel cylinder supported by said backing plate and interposed between said portions of said brake shoes for forcing said portions away from one another to engage said brake shoes with said drum in a brake position;
- a strut interconnecting said brake shoes proximate to said portions;
- a lever having a first end supported from one of said portions by a pivotal connection, said lever extending from said first end to a second end, and said lever rotatable about said pivotal connection between a normal operating position having said strut spaced from said lever and a parking brake position having said lever engage said strut to maintain said portions in said brake position;
- an electric parking brake actuator supported by said backing plate and having a linkage coacting with said second end of said lever actuatable by said electric parking brake actuator for moving said lever between said normal operating and said park brake positions, said electric parking brake actuator moving said lever to said parking brake position in response to a parking brake signal with said brake shoes in said brake position;
- a hydraulic actuator fluidly connected to said wheel cylinder;
- a controller electrically connected to said hydraulic actuator and said electric parking brake actuator for controlling said actuators in response to said parking brake signal; and
- a switch electrically connected to said controller for producing said parking brake signal,
  - wherein said electric parking brake actuator reaches a stall condition upon reaching said parking brake position and said linkage mechanically retains said lever in said parking brake position.

* * * * *